US006602842B2

(12) United States Patent
Cuperus et al.

(10) Patent No.: US 6,602,842 B2
(45) **Date of Patent: *Aug. 5, 2003**

(54) CLEANING COMPOSITIONS CONTAINING PLANT CELL WALL DEGRADING ENZYMES AND THEIR USE IN CLEANING METHODS

(75) Inventors: Roelck A. Cuperus, Amsterdam (NL); Margareta A. Herweijer, Den Haag (NL); Albert J. J. Van Ooijen, Voorburg (NL); Dick J. Van Schouwen, Vlaardingen (NL)

(73) Assignee: Genencor International, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/828,374

(22) Filed: Apr. 5, 2001

(65) Prior Publication Data

US 2003/0040454 A1 Feb. 27, 2003

Related U.S. Application Data

(62) Division of application No. 08/737,970, filed as application No. PCT/EP95/02380 on Jun. 19, 1995, now Pat. No. 5,872,091.

(30) Foreign Application Priority Data

Jun. 17, 1994 (EP) ........................................ 94201741

(51) Int. Cl.$^7$ ............................ C12S 9/00; C12S 11/00

(52) U.S. Cl. ........................ 510/392; 510/276; 510/320

(58) Field of Search ................................ 510/276, 320, 510/392

(56) References Cited

U.S. PATENT DOCUMENTS

| | | | | |
|---|---|---|---|---|
| 4,443,355 A | | 4/1984 | Murata et al. | |
| 4,978,470 A | | 12/1990 | Suzuki et al. | |
| 5,290,474 A | | 3/1994 | Clarkson et al. | |
| 5,312,561 A | | 5/1994 | Hoshino et al. | |
| 5,356,800 A | * | 10/1994 | Jaquess | 435/188 |
| 5,707,950 A | | 1/1998 | Kasturi et al. | |
| 5,872,091 A | * | 2/1999 | Cuperus et al. | 510/300 |

FOREIGN PATENT DOCUMENTS

| | | | | |
|---|---|---|---|---|
| GB | 2168393 | A | | 12/1985 |
| GB | 2168393 | A | * | 6/1986 |
| WO | 0328 229 | A1 | | 8/1989 |
| WO | WO91/09941 | | | 7/1991 |
| WO | WO91/10723 | | | 7/1991 |

OTHER PUBLICATIONS

DE 3635427, <<(In)organic dirt–removing detergent compsn.—contg. Enzyme having pectinase activity, surfactant, phosphate–free builder and high mol. Wt. Cpd. >>Oct. 18, 1985.

PCT Search Report, Sep. 14, 1995.

* cited by examiner

*Primary Examiner*—Mark Kopec
*Assistant Examiner*—Preeti Kumar
(74) *Attorney, Agent, or Firm*—Genencor International, Inc

(57) ABSTRACT

Novel cleaning compositions comprising cell wall degrading enzymes are disclosed having pectinases and/or hemicellulases and optionally cellulases. The compositions are particularly suitable for removing stains of vegetable origin, especially from textiles. Although compositions having only one type of such enzymes axe part of the invention (excluding cellulases alone), preferred embodiments have a mixture of cell wall degrading enzyme activities to allow for a concerted action against the fibrous mass which usually constitutes a stain of vegetable origin.

29 Claims, No Drawings

CLEANING COMPOSITIONS CONTAINING PLANT CELL WALL DEGRADING ENZYMES AND THEIR USE IN CLEANING METHODS

The present application is a Divisional of U.S. patent application Ser. No. 08/737,970, filed Nov. 27, 1997, now U.S. Pat. No. 5,872,091, which is a 371 of PCT/EP95/02380, filed Jun. 19, 1995, and EP 94201741.9, filed Jun. 17, 1994.

This invention relates to the use of enzymes in cleaning applications, especially in household cleaning applications. For this purpose it is known to use, for example, proteases, lipases, amylases and cellulases.

However, these enzymes are incapable of removing all kinds of dirt, soil or stains present on or in textiles, on kitchenware, etc., as are synthetic detergents and other components of cleaning compositions known in the art.

For instance, stains of e.g. vegetable origin are not sufficiently removed by current detergents, if at all.

Usually detergents comprise a bleaching agent which, through oxidative reactions, decolourizes the stains, but does not remove them.

Moreover, these bleaching agents may cause damage to the object to be cleaned, especially when it has to be cleaned often.

Stains are usually defined as intensively coloured substances that colour a fabric even when they are present in very small amounts on fibres and resist removal by detergents alone (Cutler W G, Kissa E, 1987, Detergency, theory and technology, Chapter 1, p 1–90).

A common type of stain originates from vegetable materials including the associated pigments. Examples of such stains are grass, vegetables such as spinach, beetroot, carrot, tomatoes, fruits such as all types of cherries and berries, peach, apricot, mango, bananas and grapes as well as stains from drinks derived from plant material, such as wine, beer, fruit juices and additionally tomato sauce, jellies, etc.

Pigments in these vegetable materials are usually associated with the fibrous materials which are a major part of the plant cell walls, either via covalent bonds or via physical binding ("sticking"). Removal of these pigments can be very difficult, since detergents can barely remove the fibre-pigment mass from a surface to be cleaned. Recent research has shown that plant cell walls consist of a complicated network of fibrous materials. The composition of the cell walls varies considerably, depending on the source of the vegetable material. However, in general its composition can be summarized as mainly comprising non-starch polysaccharides. These polysaccharides can be found in various forms: cellulose, hemicellulose and pectins.

The composition of a plant cell wall is both complex and variable. Polysaccharides are mainly found in the form of long chains of cellulose (the main structural component of the plant cell wall), hemicellulose (comprising e.g. various β-xylan chains) and pectin. The occurrence, distribution and structural features of plant cell wall polysaccharides are determined by: 1. plant species; 2. variety; 3. tissue type; 4. growth conditions; and 5. ageing (Chesson (1987), Recent Advances in Animal Food Nutrition, Haresign on Cole, eds.). Butterworth, London, 71–89).

Basic differences exist between monocotyledons (e.g. cereals and grasses) and dicotyledons (e.g. clover, rapeseed and soybean) and between the seed and vegetative parts of the plant (Carreand Brillouet (1986), Science and Food Agric. 37, 341–351). Monocotyledons are characterized by the presence of an arabinoxylan complex as the major hemicellulose backbone. The main structure of hemicellulose in dicotyledons is a xyloglucan complex. Moreover, higher pectin concentrations are found in dicotyledons than in monocotyledons. Seeds are generally very high in pectic substances, but relatively low in cellulosic material. Three more or less interacting polysaccharide structures can be distinguished in the cell wall:

1. the middle lamella forms the exterior cell wall. It also serves as the point of attachment for the individual cells to one another within the plant tissue matrix. The middle lamella consists primarily of calcium salts of highly esterified pectins;
2. the primary wall is situated just inside the middle lamella. It is a well-organized structure of cellulose microfibrils embedded in an amorphous matrix of pectin, hemicellulose, phenolic esters and proteins;
3. the secondary wall is formed as the plant matures.

During the plant's growth and ageing phase, cellulose microfibrils, hemicellulose and lignin are deposited.

Until the present invention there was no detergent or other cleaning agent available capable of breaking down the complex fibrous structure or gel-like matrix of plant cell walls or components thereof, thereby releasing the pigment from the surface, object, or fabric to be cleaned.

The present invention not only seeks to solve the problem of removing stains of vegetable origin, but it also aims to help remove soil and dirt, which soil and dirt have, at least in part, a similar structure (e.g. stains of a food composition in which plant cell wall components are present as thickeners or gelating agents or the like).

The present invention can thus solve this problem by providing a cleaning composition comprising at least one plant cell wall degrading enzyme, or a substance having the same activity as such an enzyme, with the proviso that when only one type of such an enzyme is present, it is not a cellulase. Thus the invention does not contemplate the use of solely one or more cellulases alone, but employs other plant cell wall degrading enzymes (although cellulases can be included with such other enzymes if desired). Hence a first aspect of the invention relates to a cleaning composition comprising one or more substances that are capable of degrading plant cell walls, other than a composition comprising one or more cellulases as the only plant cell wall degrading substance(s).

This proviso is made because cellulases are known to be included in cleaning compositions. In current detergents intended for cleaning textiles cellulases are sometimes incorporated to improve softness, as an anti-pilling component, or for additional cleaning effects. Cellulases can, however, not be used in significant amounts, since many textile fibres comprise a high percentage of cellulose fibres, which of course are susceptible to breakdown by these enzymes. These enzymes by themselves are therefore not particularly suitable for the main purpose of the present invention, since they cannot be added in a sufficient amount to remove stains of vegetable origin without damaging the textile. They can, however, be used in combination with other enzymes which are capable of breaking down cell walls, in which case they can be added in lower amounts, because of the concerted action on the fibrous mass of such stains by the mixture of enzymes. Thus, the use of cell wall degrading enzymes can create optimal cleaning conditions, without damage to textile fibres, if the amount of cellulase(s) is reduced to less than 50%, preferably less than 25% and most preferably less than 10% of the total amount (w/w) of plant cell wall degrading enzymes added. In some embodiments there may be no cellulase(s) at all.

Cleaning compositions according to the invention thus comprise at least 50%, preferably at least 75% of a pectinase and/or a hemicellulase based on the total amount (w/w) of plant cell wall degrading enzymes. In some embodiments the composition may comprise 90% (w/w) or more of a pectinase or a hemicellulase as the plant cell wall degrading enzyme activity.

There is a high degree of interaction between cellulose, hemicellulose and pectin in the cell wall. The enzymatic degradation of these rather intensively cross-linked polysaccharide structures is not a simple process. A large number of enzymes are known to be involved in the degradation of plant cell walls. They can broadly be subdivided in cellulases, hemicellulases and pectinases (Ward and Young (1989), CRC Critical Rev. in Biotech. 8, 237–274).

Cellulose is the major polysaccharide component of plant cell walls. It consists of β1,4 linked glucose polymers.

Cellulose can be broken down by cellulases, also called cellulolytic enzymes. Cellulolytic enzymes have been divided traditionally into three classes:

endoglucanases, exoglucanases or cellobiohydrolases and β-glucosidases (Knowles, J., et al. (1987), TIBTECH 5, 255–261). Like all cell wall degrading enzymes they can be produced by a large number of bacteria, yeasts and fungi. Apart from cellulases degrading β-1,4 glucose polymers, endo-1,3/1,4 β-glucanases and xyloglucanases should be mentioned (Ward and Young op. cit.).

Pectins are major constituents of the cell walls of edible parts of fruits and vegetables. The middle lamella which are situated between the cell walls are mainly built up from protopectin which is the insoluble form of pectin. Pectins are considered as intracellular adhesives and due to their colloidal nature they also have an important function in the water regulation system of plants. The amount of pectin can be very high. For example, lemon peels are reported to contain pectin at up to 30% of their dry weight, orange peels contain from 15–20% and apple peels about 10% (Norz, K. (1985). Zucker und Susswaren Wirtschaft 38, 5–6).

Pectins are composed of a rhamno-galacturonan backbone in which 1,4-linked (α-D-galacturonan chains are interrupted at intervals by the insertion of 1,2-linked (α-L-rhamnopyranosyl residues (Pilnik, W. and A. Voragen (1970), In: The Biochemistry of fruits and their products, vol. 1, chapter 3, p. 53. Acad. Press). Other sugars, such as D-galactose, L-arabinose and D-xylose, are present as side chains. A large part of the galacturonan residues is esterified with methyl groups at the C2 and C3 position.

A large number of enzymes are known to degrade pectins. Examples of such enzymes are pectin esterase, pectin lyase (also called pectin transeliminase), pectate lyase, and endo- or exo-polygalacturonase (Pilnik and Voragen (1990). Food Biotech 4, 319–328). Apart from enzymes degrading smooth regions, enzymes degrading hairy regions such as rhamnogalacturonase and accesory enzymes have also been found (Schols et al. (1990), Carbohydrate Res. 206, 105–115; Searle Van Leeuwen et al. (1992). Appl. Microbiol. Biotechn. 38, 347–349).

Hemicelluloses are the most complex group of non-starch polysaccharides in the plant cell wall. They consist of polymers of xylose, arabinose, galactose or mannose which are often highly branched and connected to other cell wall structures. Thus a multitude of enzymes is needed to degrade these structures (Ward and Young op.cit.). Xylanase, galactanase, arabinanase, lichenase and mannanase are some hemicellulose degrading enzymes.

Endo- and exo-xylanases and accessory enzymes such as glucuronidases, arabinofuranosidases, acetyl xylan esterase and ferulic acid or coumaric acid esterase have been summarized by Kormelink (1992, Ph.D.-thesis, University of Wageningen, The Netherlands). They are produced by a wide variety of micro-organisms and have varying temperature and pH optima.

Like other cell wall degrading enzymes (CWDE'S) galactanases occur in many micro-organisms (Dekker and Richards (1976), Adv. Carbohydrat. Chem. Biochem. 32, 278–319). In plant cell walls two types of arabinogalactans are present: type I 1,4 β-galactans and type II 1,3/1,6 β-galactans which have a branched backbone (Stephen (1983). In: The Polysaccharides. G. O. Aspinael (ed.). Ac. Press, New York, pp. 97–193). Both types of galactans require their own type of endo enzyme to be degraded. It can be expected that other enzymes, such as arabinan-degrading enzymes and exo-galactanases play a role in the degradation of arabinogalactans.

The hemicellulose 1,3–1,4-β-glucan is a cell wall component present in cereal (barley, oat, wheat and rye) endosperm. The amount of β-glucan in cereal endosperm varies between 0.7–8%. It is an unbranched polysaccharide built from cellotriose and cellotetraose residues linked by a 1,3-glucosidic bond. The ratio tri/tetra saccharose lies between 1.9 and 3.5.

Lichenase (EC 3.2.1.73) hydrolyse 1,4-beta-D-glucosidic linkages in beta-D-glucans containing 1,3- and 1,4-bonds. Lichenase reacts not on beta-D-glucans containing only 1,4-bonds such as for example in cellulose. Thus, damage of cellulose fibres in fabrics does not occur by the application of lichenase. Lichenases are produced by bacteria like *B. amyloliquefaciens, B. circulans, B. licheniformis* and plants (Bielecki S. et al. Crit. Rev. in Biotechn. 10(4), 1991, 275–304).

Arabinans consist of a main chain of α-L-arabinose subunits linked (α-(1→5) to another. Side chains are linked α-(1→3) or sometimes α-(1→2) to the main α-(1→5)-L-arabinan backbone. In apple, for example, one third of the total arabinose is present in the side chains. The molecular weight of arabinan is normally about 15 kDa.

Arabinan-degrading enzymes are known to be produced by a variety of plants and micro-organisms. Three enzymes obtainable from *A. niger* have been cloned by molecular biological techniques (EPA 0506190). Also arabinosidase from bacteria such as Bacteroides has been cloned (Whitehead and Hespell (1990). J. Bacteriol. 172, 2408).

Galactomannans are storage polysaccharides found in the seeds of Leguminosae. Galactomannans have a linear (1-->4)-β-mannan backbone and are substituted with single (1-->6)α-galactose residues. For example in guar gum the ratio mannose/galactose is about 2 to 1. Galactomannans are applied as thickeners in food products like dressings and soups.

Mannanase enzymes are described in PCT application WO 93/24622.

Glucomannan consists of a main chain of glucose and mannose. The main chain may be substituted with galactose and acetyl groups; mannanases can be produced by a number of microorganisms, including bacteria and fungi.

To summarise, it can be said that a large number of plant cell wall degrading enzymes exist, produced by different organisms. Depending on their source the enzymes differ in substrate specificity, pH and temperature optima, Vmax, Km etc. The complexity of the enzymes reflects the complex nature of plant cell walls which differ strongly between plant species and within species between plant tissues. A suitable enzyme mixture can be prepared depending on the source of plant material, the purpose of the application and the specific application conditions.

In recent years the availability and variety of these cell wall degrading enzymes has increased considerably, which opens up the possibility of using selected combinations of these enzymes as additives in detergents. These detergents are particularly suitable for the removal of stains from vegetable origin.

Whereas the more thoroughly studied cell wall degrading enzymes originate from fungi and display pH optima in the acid pH range, nowadays more and more CWDE's are being described which are active in more alkaline conditions, e.g.: xylanases (Shendye A, Rao M, 1993, FEMS Microbiol Lett 108, 297–302; Nakamura S, Wakabayashi K, Nakai R, Aono R, Horikoshi K, 1993, Appl Environ Microbiol 59, 2311–2316), mannanases (Akino T, Nakamura N, Horikoshi K, 1988, Agric Biol Chem 52, 773–779), galactanases (Tsumura K, Hashimoto Y, Akiba T, Horikoshi K, 1991, Agric Biol Chem 55, 125–127). This property makes these enzymes compatible with the current detergent formulations.

In many cases it will be possible to obtain the enzymes useful in the invention by culturing a micro-organism producing it and isolating the enzyme from the culture or the culture broth.

The enzymes useful in the invention can also be obtained through recombinant DNA technology, whereby a host cell is provided with the genetic information encoding the desired enzyme, together with suitable elements for expression of that genetic information.

A host cell may be a homologous micro-organism, or a heterologous micro-organism, which both may include but are not limited to bacteria, bacilli, yeasts and fungi; they can however also include higher eukaryotic cells such as plant or animal cells. It may also be very useful to provide a host cell with genetic information encoding more than one enzyme or more than one enzyme activity, for example a hybrid enzyme.

Although some emphasis has been placed on micro-organisms as a convenient source for the enzymes useful in the invention, it will be understood that enzymes from any source may be used, as long as they possess the activity of being able to break down at least parts of plant cell walls.

Since this activity is the most relevant property it will be clear that derivatives, fragments or combinations thereof with the same or similar activity can also be used and are to be included within the definition of enzyme.

Derivatives are explicitly meant to include mutants in which one or more amino acids have been added, deleted or substituted to maintain or improve certain properties of the enzymes, as well as chemically modified enzymes.

Compositions according to the invention may comprise a single enzyme (in which case the enzyme will not be a cellulase), although it is preferred that they contain a mixture of different enzymes, which are preferably capable of degrading different parts of plant cell walls or other components of stains, which stains have at least in part, a similar structure (e.g. stains of a food composition in which plant cell wall components are present as thickeners or gelating agents or the like).

For the most efficient removal of stains enzymes are preferred which have endo-splitting activities. These enzymes cut polymeric fibre compounds into smaller pieces and therefore increase the solubilization of the fibre mass with its associated pigments.

The compositions may be specifically adapted for their intended use. Compositions for cleaning textiles, either by hand or automatically will generally comprise different ingredients than compositions for cleaning kitchenware or for instance floors and tiles. Especially preferred compositions are so-called "pre-spotters".

Usual ingredients for such compositions include surfactants, builders, bleaching agents, enzymes such as amylases and proteases, etc. The preferred compositions according to the invention are those intended for cleaning textiles.

Hence preferred compositions of the first aspect are detergent compositions. These may include washing powders and liquids, dish washing compositions, household or domestic (eg. floor and tile) cleaners, pre-wash compositions and/or other textile, fabric and cloth cleaning compositions.

A second aspect of the invention relates to a method of cleaning an object or surface, the method comprising contacting the object or surface with a composition of the first aspect and allowing cleaning to occur. The surface may be present on, for example, a floor or tile, and the object can be a textile or fabric article or an item of kitchenware (such as cutlery or crockery). Preferred features and characteristics of the second aspect are as for the first mutatis mutandis.

The invention will be explained in more detail in the following examples which are provided for illustration and are not to be construed as being limiting on the invention.

EXAMPLE 1

Source of Enzymes

Purified enzymes used in this study include the following.

A. Cellobiohydrolase III (EC 3.2.1.91) from *Trichoderma viride* was purified from a commercial cellulolytic enzyme preparation Maxazyme® CL2000 (Gist-brocades) according to the method of Beldman et al. (Eur. J. Biochem 146 (1985), 301–308). After purification, the enzyme fraction containing CBHIII was concentrated by ultrafiltration on a Filtron membrane (cut off 10 kD) to a protein concentration of 108.6 mg/ml.

B. Endo-glucanase V (EC 3.2.1.4, this is not the standard endo-glucanase) was also purified from Maxazyme® CL2000 according to Beldman et al. (op cit.). After purification the enzyme was concentrated by ultrafiltration on a Filtron membrane (cut-off 10 kD) to a protein concentration of 48.2 mg/ml.

C. Endo-arabinanase (EC 3.2.1.99) was obtained from *A. nidulans* strain G191 transformed with the AbnA gene (from EP-A-0 506 190). Material from strain G191::pIM950–170, designated ABN102 was used for this study. Strain ABN102 was grown for 40 hours at 30° C. in 2 liter shake flasks containing 0.5 litre medium. The medium contained, per liter: 10 g sugar beet pulp, 1 g yeast extract, 15 g magnesium sulphate, 0.5 g potassium chloride, 1 ml Vishniac solution. Vishniac solution contains, per 100 ml: 0.44 g zinc sulphate hepta-hydrate, 0.1 g manganese chloride tetra-hydrate, 0.03 g cobalt chloride hexa-hydrate, 0.03 copper sulphate pentahydrate, 0.025 g disodium molybdate dehydrate, 0.14 g calcium chloride dihydrate, 0.1 g ferrous sulphate hepta-hydrate and 1.0 g EDTA. The pH of the medium was adjusted to 6.0 with 1 N KOH.

After fermentation the medium was made germfree by filtering successively over the following filters:

1. filter paper (Buchner-funnel);
2. glass-fibre filter (Whatmann GF/A or GF/B);
3. hardened filter circles (Whatmann);
4. 0.45 $\mu$m membrane filter (Schleicher & Schuell).

The sterile fermentation supernatant was further concentrated by ultrafiltration, as described above, to a protein concentration of 12.2 mg/ml.

D. Endo-pectinase (Pectin lyase: EC 4.2.2.10) is one of the endo-pectinase options and was purified from a commerical pectolytic enzyme preparation Rapidase Press® (Gist-brocades) by the following method.

After loading of the enzyme preparation on Whatmann QA-cellulose/DS 29, the column was washed with 0.02 M phosphate buffer pH 6.0, containing 0.2 M NaCl. Endo-pectinase was eluted with the same buffer containing 0.2 NaCl. After purification the enzyme was concentrated on an Amicon filter type YM10 (cut off 10 kD) to a protein concentration of 14.5 mg/ml.

E. Arabinofuranosidase B (EC 3.2.1.55) was produced from *Aspergillus niger* strain N593 transformed with multiple copies of the abfβ gene from *A. niger* (EP-A-0 506 190) under control of the amyloglucosidase promoter from *A. niger* (EP-A-0506190). The best-producing transformant, designated N593-T8, was grown as described in EP-A-0 506 190.

After fermentation the enzyme batches were made germ-free as described for endo-arabinase. The fermentation supernatant was concentrated by ultrafiltration as described under D and freeze-dried.

Before use, arabinofuranosidase B was dissolved in water to a protein concentration of 118.9 mg/ml. F. Endo-xylanase I (EC 3.2.1.8) was isolated from *A. niger* CBS 513.88 transformed with plasmid pXYL3AG containing the xylanase gene under control of the *A. niger* amyloglucosidase promoter as described in EP-A-0 463 706. The strain was grown as described in EP-A-0 463 706 and the fermentation supernatant was made germfree as described for endo-arabinase.

The supernatant was dried by ultrafiltration as described for endo-arabinase and dissolved in water to a protein concentration of 72.0 mg/ml.

G. Endo-galactanase (EC 3.2.1.89) was obtained from Megazyme Ltd. (Australia). The preparation has a specific activity of 408 U/mg. It has a protein concentration of 1.08 mg/ml.

Other enzymes which are either purified or produced by TUDVA technology can be used as well.

Commercially available enzymes used include pectinase containing Rapidase Press® (Gist-brocades), lichenase, cellulase and xylanase containing Filtrase BR® (Gist-brocades), cellulase and xylanase containing Maxazyme® CL 2000 (Gist-brocades), hemicellulase containing Fermizym H400® (Gist-brocades) and xylanase containing Xylanase 5000® (Gist-brocades).

EXAMPLE 2

The wash performance of various enzyme mixtures was determined in a specially developed washing test, which is described in detail in EP-A-0328229. In addition to a sodiumtripolyphosphate (STPP) containing powder detergent (IEC-STPP) used in this example a non-phosphate containing powder detergent (IEC-zeolite) was also used. The typical features of both test systems, which were applied to test the wash performance of the new enzyme mixtures are summarized below:

| Washing System | IEC-STPP | IEC-zeolite |
|---|---|---|
| Dosed detergent/bleach | 4 g/l | 7 g/l |
| Sud volume per beaker (ml) | 250 | 200 |

-continued

| Washing System | IEC-STPP | IEC-zeolite |
|---|---|---|
| temperature | 40 | 30 |
| time (min.) | 30 | 30 |
| detergent | IEC-STPP | IEC-zeolite |
| detergent dosage (g/l) | 3.68 | 5.6 |
| Na-perborate.4aq (g/l) | 0.32 | 1.4 |
| TAED (mg/l) | 60 | 210 |
| EMPA 116/117 (5 × 5 cm) | 2/2 | 2/2 |
| CFT swatches | 0 | 2 |
| EMPA 221 clean swatch (10 × 10 cm) | 0 | 2 |
| Stainless steel balls (φ 6 mm) | 0 | 15 |
| [$Ca^{2+}$] (mM) | 2 | 2 |
| ($Mg^{2+}$] (mM) | 0.7 | 0.7 |
| [$NaCO_3$] (mM) | 2.5 | 0 |

The IEC-STPP detergent powder (IEC Test Detergent Type I, Formulation May 1976) and the IEC-zeolite detergent powder (Formulation April 1988) were purchased from WFK-Testgewebe GmbH, Alderstrasse 44, D-4150, Krefeld, Germany.

The wash performance of the enzyme mixtures was measured at 40° C. for 30 minutes and at 30° C. for 20 minutes.

In order to determine the wash performance of some of the enzyme mixtures under conditions of low detergency to mimic typical U.S. conditions for 20 minutes at 38° C., washes were performed using a washing test similar to that described above, but with some modifications. The main characteristics of the test are summarized below:

| | |
|---|---|
| Sud volume per beaker (ml) | 200 |
| time (min.) | 20 |
| detergent A dosage (g/l) | 1.3 |
| EMPA 116/117 (5 × 5 cm) | 2/2 |
| CFT swatches (5 × 5 cm) | 2 |
| EMPA 221 clean swatch (10 × 10 cm) | 2 |
| Stainless steel balls (φ 6 mm) | 15 |
| [$Ca^{2+}$] (mM) | 2 |
| [$Mg^{2+}$] (mM) | 0.7 |

The composition of detergent A was as follows:

| Ingredients | % by weight |
|---|---|
| Alcohol ethoxylate | 13 |
| LAS-90 | 7 |
| Polyacrylate | 1 |
| Zeolite | 35 |
| Na-silicate | 3 |
| $Na_2CO_3$ | 20 |
| Tri-Na-citrate.$2H_2O$ | 4 |
| $Na_2SO_4$ | 8 |
| Water | to 100 |

The performance of the enzyme mixtures was measured on CFT swatches (purchased from CFT, Center for Test Materials, P.O. Box 120, Vlaardingen, The Netherlands). These swatches were soiled with stains designed to measure the performance of plant cell wall degrading enzymes. Amongst others the soiling involved mango pulp, peach pulp, red fruit pulp, spinach and tomato-containing sauces and dressings.

The following enzyme preparations were tested on their wash performance: commercial mixtures such as Rapidase Press® (Gist-brocades); purified individual plant cell wall degrading enzymes such as cellobiohydrolase 11, endoglucanase V, endo-arabinanase, endo-pectinase, arabinofuranosidase B, endoxylanase 1 and endo-galactanase; several mixtures of purified cell wall degrading enzymes.

The soiled swatches were washed in the presence of the enzyme preparations and in the absence of the enzyme preparations.

The contribution of the enzyme preparation to the detergency was measured on a Datacolor Elrephomoter 2000. The detergency was determined by the following function:

$$\text{detergency} = \frac{R(\text{soiled, washed}) - R(\text{soiled, not washed})}{R(\text{unsoiled, not washed}) - R(\text{soiled, not washed})}$$

with R denoting remission.

The results show that the compositions of the invention containing cell wall degrading enzymes or mixtures thereof gave an increase in removal of stains containing vegetable material, fruits, sauces, juices, jellies, etc.

EXAMPLE 3

A small scale test system was developed for measuring the performance of the enzymes in laundry and automatic dishwashing.

3.1 Test Materials

For dishwashing purpose stains and food residues were attached to glass (object glass for microscope, 76 mm×26 mm) by immersing the glass into the stain solution or food followed by drying overnight in vertical position at room temperature. Additionally accellerated ageing was achieved by oven drying (24 hours) at 40° C.

For laundry purpose stains of e.g. food residues were absorbed or spread on cotton—(Empa art. nr 221) or polyester—(EMPA art. nr 407) fabrics of 5×35 cm. Before performing the washing tests, these fabrics were cut into pieces of 2.5×2.5 cm. Ageing of stains was carried out by drying at room temperature for several days.

Stains were for example made from compositions in which pigments were covalently attached to plant cell wall material. These compositions e.g. Azo-Wheat-Arabinoxylan®, Azo-Barley-Glucan®, were obtained from Megazyme (Australia).

Stains were also made from compositions comprising a plant cell wall derived material (e.g. guar gum from Aldrich) which formed a complex with a dye (e.g. Congo Red from Sigma).

Furthermore stains were made from food compositions, comprising plant cell wall derived thickeners e.g. salad dressing: Thousand Islands® obtained from selling agency Albert Heijn (Netherlands), which contains mannan.

3.2 Test System

Plastic tubes (Greiner, 50 ml), containing 25 ml detergent were placed in a thermostated waterbath (40° C. or any other preferred temperature). After equilibration, enzyme and test material were added and the plastic tube was closed. The tubes were placed in a Heidolph tube rotator device (30 rpm) that was installed in a preheated (40° C. or any other preferred temperature) oven. After incubation (20 min.) the tubes were emptied and the test material was dried on Kleenex® tissues in advance of assessing the performance of the cell wall degrading enzymes.

For laundry-tests (tests on cotton or polyester) the following detergents were used:

LIQUID TIDE® (type October 1994);
ARIEL ULTRA® (type March 1992).
TIDE POWDER® (type 1995)

The detergents were free of bleach. LIQUID TIDE® and ARIEL ULTRA® were free of enzyme compounds. The enzyme components in TIDE POWDER® were deactivated by 2 min. heating at 80° C. LIQUID TIDE® was used at 1 g/l in synthetic tap water ('synthetic tap water' is demineralised water to which $Mg^{2+}$and $Ca^{2+}$were added to give a defined hardness) at a German Hardness (GH) of 5 (5 GH=0.23 mM Mg and 0.67 mM Ca). ARIEL ULTRA® was used at 5 g/l in synthetic tapwater at a German Hardness of 15 (15 GH=0.7 mM $Mg^{2+}$and 2 mM $Ca^{2+}$). TIDE POWDER® was used at 1.3 g/l in synthetic tap water at a German Hardness of 15.

For automatic dish washing tests (tests on glass) we used CALGONIT FLUSSIG® (type March 1992);

This detergent is free of bleach components and the enzyme components were deactivated by 2 min. heating at 80° C. Calgonit Flüssig® was used at 5 g/l in synthetic tapwater at a German hardness of 15.

3.3 Conditions

The test conditions (for laundry and automatic dishwashing) were 20 minutes washing at 40° C. or any other preferred temperature. The performance of the cell wall degrading enzymes on stains and food residues was evaluated visually by a panel or measured by a light reflectance (remission) measurement with a Photovolt photometer Model 577 equipped with a green light filter. The detergency was calculated using the equation described in example 2.

3.4 Enzyme Sources

Xylanase from *A. tubigensis* (CBS 323.90)

A culture filtrate was obtained by the culturing of *Aspergillus niger* DS16813 (CBS 323.90—later reclassified as more likely belonging to the species *A. tubigensis;* Kusters-van Someren et al. (1991)) in a medium containing (per liter): 30 g oat spelt xylan (Sigma); 7.5 g $NH_4NO_3$, 0.5 g KCl, 0.5 g $MgSO_4$, 15 g $KH_2PO_4$, and 0.5 g yeast extract (pH 6.0). The culture filtrate was concentrated to a volume of approximately 35 ml which was then ultrafiltrated on a Diaflo PM 10 filter in a 50 ml Amicon module to remove salts.

The supernatant was then concentrated to a volume of 10 ml and the retentate was washed twice with 25 ml 25 mM Tris-HCL buffer (pH 7.0). After washing, the retentate volume was brought to 25 ml. The resulting xylanase containing composition will be refered to in the experiments as "xylanase from *A. tubigensis*".

Xylanase from *Disporotrichum dimorphosporum*

The xylanase containing commercial product Xylanase 5000® (Gist-brocades) will be referred to in the experiments as "xylanase from *D. dimorphosporum*".

Xylanase from KEX301

The alkaline xylanase (with pH optimum above 7) which was obtained from *E. coli* clone KEX301 (described in pending application PCT/EP94/04312: donor organism was CBS 672.93 a Bacillus-type microorganism) will be referred to in the experiments as "xylanase from KEX301".

Xyn D xylanase from TG53

The xylanase which is coded for by a nucleotide sequence of the xyn D gene of the strain TG53 (deposited at CBS as CBS 211.94) was obtained as described in the pending PCT-application filed on Jun. 14, 1995. The application number is not yet available. The thus obtained xylanase will be referred to in the experiments as "xyn D xylanase from TG53".

Endoxylanase I from *A. tubigensis* (CBS 323.90)

Endoxylanase I (EC 3.2.1.8) was isolated from *A. niger* CBS 513.88 transformed with plasmid pXyl3AG containing the xylanase gene under control of the *A. niger* amyloglucosidase promoter as described in EP-A-0463706. The strain was grown as described in EP-A-0463706 and the fermentation was made germfree by filtering successively over the following filters:

1. filter paper (Buchner-funnel);
2. glass-fibre filter (Whatmann GF/A or GF/B);
3. hardened filter circles (Whatmann);
4. 0.45 μm membrane filter (Schleicher & Schuell).

The sterile fermentation supernatant was further concentrated on an Amicon filter type YM10 (cut off 10 kD) to a protein concentration of 12.2 mg/ml.

The thus obtained xylanase preparation will be referred to in the experiments as "endoxylanase I".

Lichenase from *B. amyloliquefaciens*

The lichenase containing commercial product Filtrase BR® was used as the source for lichenase. The lichenase purified from Filtrase BR® will be referred to in the experiments as "lichenase from *B. amyloliquefaciens*".

Galactomannanase Sumizyme ACH®

The galactomannanase containing commercial product Sumizyme ACH® (Shin nihon: lot NR. 91–1221 of 100.000 U/g) will be referred to in the experiments as "galactomannanase Sumizyme ACH®".

Mannanase Megazyme

The mannanase (EC 3.2.1.25) containing commercial product beta-mannanase (Megazyme: batch MMA82001 of 38 U/mg protein and 418 U/ml) will be referred to in the experiments as "mannanase Megazyme".

Alkaline mannanase

Alkaline mannanase was obtained by growing for 72 hours at 37° C. a strain C11SB.G17 (which was deposited at Centraal Bureau voor Schimmelcultures in Baarn, the Netherlands, on Jun. 16, 1995; strain deposit number: CBS 480.95) on a minimal medium of pH=10 containing in g/l:

0.5 yeast extract (Difco), 10 $KNO_3$, 1 $K_2HPO_4$, 0.2 $MgSO_4.7H_2O$, 10 $Na_2CO_3$, 20 NaCl and 1 guar gum (Sigma).

After growing in baffled shake flasks, the culture was centrifuged for separation of biomass. The supernatant was concentrated over a 10 KDa membrane to a mannanase activity of 60 AMU/l.

The thus obtained mannanase containing composition will be referred to in the experiments as "alkaline mannanase".

3.5 Enzyme Activity Measurements

Protease activity (in DU=Delft Units) was determined according to Detmar et al., JAOCS 48, (1971), 77–79. Amylase activity (expressend in TAU) was determined according to the method described in Example 8(a) of WO 9100353.

Xylanase activity in EXU was determined by the following method: Tubes containing 0.8% oat spelt xylan in 100 mM citric acid buffer pH 3.5 were pre-incubated (15 min.) at 40° C. The reaction was initiated by the addition of 0.04–0.15 EXU/ml 100 mM citric acid buffer pH=3.5. After 60 minutes the reaction was stopped by the addition of dinitrosalicylic acid (DNS, according to Miller, Anal. Chem. 31, (1959), 426–428).

The activity in EXU was calculated using a xylose calibration line, determined under the same conditions. One EXU is defined as the amount of enzyme that produces 1 μmol xylose reducing sugar equivalents/min under the conditions described above.

The lichenase activity in (BGLU) was determined by measuring the viscosity reduction of a β-glucan solution.

The β-glucan (5 gram) was dissolved in 100 ml 50 mM K-phosphate buffer pH 6.5 under heating up to 100° C. After cooling the substrate solution was placed in a waterbath at 45° C. After equilibration 2 ml of an enzyme solution containing 0.006–0.012 BGLU/ml in 50 mM K-phosphate buffer pH 6.5 was added to 20 ml substrate solution.

At 3–6–9–12–15 minutes after starting the reaction the viscosity (flow out time in seconds) was measured in an Ubbelhode N°1C, that was equilibrated at 45° C. ($T_t$). The initial viscosity of the β-glucan solution ($T_0$) was measured after the addition of 2 ml 50 mM K-phosphate buffer. The maximum reduction in viscosity of the β-glucan solution ($T_m$) was measured by incubation with 2.5 BGLU/ml for at least 1 hour at 45° C.

The slope K ($sec^{-1}$) was calculated from the graph: incubation time versus X, where X is calculated from the formula $(T_0-T_m)/(T_t-T_m)$ for each measurement.

The activity in BGLU/g or BGLU/ml is calculated with the formula: (K×11)/C in which 11=(20 ml+2 ml)/2 ml C=concentration of the sample in g/ml or ml/ml 1 BGLU=the amount of enzyme that is capable of changing the apparent velocity constant by 1 [$sec^{-1}$]

Alkaline mannanase activity (in AMU=alkaline mannanase unit) was determined by the following method: a sample of the obtained mannanase composition was incubated for 15 minutes at 60° C. in a 50 mM phosphate pH=8.0 buffer containing 0.25% guar gum (Sigma). After this incubation the reducing sugar was determined with dinitrosalicylic acid (DNS) according to Miller (Anal. Chem. 31, (1959), 426–428). 1 AMU is defined as the amount of enzyme that is capable of producing 1 μmol of mannase reducing sugar equivalents per minute.

Xylanase viscosifying activity (XVU) is determined by measuring the viscosity reduction of a xylan-solution. The xylan (8 gram) was dissolved in 200 ml distilled water. The pH was adjusted to 4.7 using a 50% acetic acid solution. The xylan solution was centrifuged for 10 minutes at 4000 rpm and the supernatant was used as a substrate solution.

The substrate solution was placed in a waterbath at 42° C. After equilibration 2 ml of an enzyme solution containing 0.6–1.0 XVU/ml was added to 20 ml substrate solution.

At 3–6–9–12–15 minutes after starting the reaction the viscosity (flow out time in seconds) was measured in an Ubbelhode N°1C, that was equilibrated at 42° C. ($T_t$). The initial viscosity of the xylan-solution ($T_0$) was measured after the addition of 2 ml distilled water. The maximum reduction in viscosity of the xylan solution ($T_m$) was measured by incubation with 100 XVU/ml for at least 1 hour at 42° C.

The slope K ($min^{-1}$) was calculated from the graph: incubation time versus X, where X is calculated from the formula $(T_0-T_m)/(T_t-T_m)$ for each measurement.

The activity in XVU/ml or XVU/g is calculated with the formula: (K×11)/5×C in which 11=(20 ml+2 ml)/2 ml C=concentration of the sample in g/ml or ml/ml 5=5 minutes (see definition)

1 XVU=the amount of enzyme that is capable of changing the apparent velocity constant by 5 ($min^{-1}$).

Xylanase activity (in XU) was determined using the analysis procedure described in example 2 (procedure 1) of pending patent application PCT/EP94/04312. Oat spelt was used as substrate, the pH was 7 and the temperature was 65° C.

3.6.1 Tests for Xylanases

Azo-Wheat-Arabinoxylan® stains were made on cotton (obtained from EMPA art. nr 221) fabrics as described above. The fabrics were washed as described above at 40° C. The detergency-values were calculated from the results of the reflectance measurements. The detergency-results of the washing tests are presented in table 3 for LIQUID TIDE® and in table 4 for ARIEL ULTRA®.

TABLE 3

Detergency results after washing test in LIQUID TIDE ®.

| Experiment | enzyme activity/ml | Detergency |
|---|---|---|
| without enzyme | — | 0.43 |
| Maxatase ® (protease of Gist-brocades) and Maxamyl ® (amylase of Gist-brocades | 20 DU/ 0.27 TAU | 0.48 |
| with xylanase from *A. tubigensis* | 10.0 EXU | 0.67 |
| with xylanase from *D. dimorohosporum* | 0.3 XVU | 0.59 |
| with xylanase from KEX301 | 3.2 XU | 0.65 |
| with xyn D xylanase from TG53 | 11.8 XU | 0.69 |

As will be apparent from the above results, the xylanases provide for improved washing results even when compared with a detergent containing a protease and an amylase.

TABLE 4

Detergency after washing in Ariel Ultra ®.

| Experiment | enzyme activity/ml | Detergency |
|---|---|---|
| without enzyme | — | 0.44 |
| with xylanase from KEX301 | 3.2 XU | 0.56 |
| with xyn D xylanase from TG53 | 11.8 XU | 0.48 |
| with xylanase from *D. dimorphosporum* | 0.3 XVU | 0.47 |

3.6.2

The experiment of 3.6.1 with Liquid Tide® was reproduced at a washing temperature of 25° C. The results of this experiment are shown in table 5.

TABLE 5

Detergency on cotton soiled with Azo-Wheat-Arabinoxylan ® after washing test in Liquid Tide ® at 25° C.

| | activity/ml | Detergency |
|---|---|---|
| without enzyme | — | 0.49 |
| xylanase from *A. tubigensis* | 10.0 EXU | 0.72 |
| xylanase from *D. dimorphosporum* | 0.3 XVU | 0.58 |
| xylanase from KEX301 | 3.2 XU | 0.65 |
| xyn D xylanase from TG53 | 11.8 XU | 0.70 |

3.6.3

Xylanases were even further tested in a Launderometer washing test. Cotton (EMPA art. NR. 221) fabrics of 5×5 cm were soiled with Azo-Wheat-Arabinoxylan® as described above. The fabrics were washed in a Launderometer for 20 minutes at 38° C. Tide Powder® was used as the detergent. During the washing procedure stainless steel balls (15) and 2 clean EMPA art. NR. 221 swatches of 10×10 cm, were present to resemble real laundry washing application conditions. After washing the fabrics were air-dried and the reflectance of the test cloth was measured with a Photovolt photometer Model 577 equipped with a green light filter. The detergency was calculated from the results of these reflectance measurements as described in Example 2. The detergency results are presented in table 6.

TABLE 6

Detergency on cotton soiled with Azo-Wheat-Arabinoxylan ® after washing with Tide Powder ® in the Launderometer (38° C.).

| | Activity/ml | Detergency |
|---|---|---|
| without enzyme | — | 0.39 |
| xylanase from KEX 301 | 1.6 XU | 0.51 |

3.6.4

Xylanase was further tested using a pre-spot test. Azo-Wheat-Arabinoxylan® stains were made on cotton (EMPA art. nr. 221) fabrics as described above. A certain amount of enzyme activity (1 ml of a enzyme solution in 50 mM citrate buffer of pH=5.5), was spotted on the stained cotton and incubated for 30 minutes at about 20° C. After this incubation the fabrics were washed as described in 3.6.3 with a Launderometer in Tide Powder® at 38° C. Detergency results are presented in table 7.

TABLE 7

Detergency on cotton soiled with Azo-Wheat-Arabinoxylan ® after pre-spotting with xylanases and washing in Tide Powder ® at 38° C.

| | Activity | Detergency |
|---|---|---|
| without enzymes | — | 0.56 |
| xylanase from *A. tubigensis* | 250 EXU | 0.63 |
| Endoxylanase I | 527 EXU | 0.70 |

Xylanases provide for improved washing results if they are used in a pre-spot composition.

3.7.1 Test for Lichenase

Azo-Barley-Glucan® stains were made on cotton (EMPA nr. 221) fabrics. The fabrics were washed with Liquid Tide® as described above at 40° C. Detergency values were calculated from the reflectance measurements as described before. The detergency-results of the washing tests are presented in Table 8.

TABLE 8

Detergency after washing in Liquid Tide ®

| Experiment | enzyme activity/ml | Detergency |
|---|---|---|
| without enzyme | — | 0.41 |
| Maxatase ® with Maxamyl ® | 20 DU/ 0,27 TAU | 0.47 |
| with lichenase from *B. amyloliquefaciens* | 4.5 BGLU | 0.68 |

3.7.2

Lichenases were further tested in a Launderometer experiment. Cotton (EMPA art. NR. 221) fabrics of 5×5 cm were soiled with Azo-Barley-Glucan® as described above. The fabrics were washed in a Launderometer for 20 minutes at 38° C. Tide Powder® was used as the detergent. During washing procedure stainless steel balls (15) and 2 clean EMPA art. NR. 221 swatches of 10×10 cm, were present to resemble real laundry washing application conditions. After washing the fabrics were air-dried and the reflectance of the test cloth was measured with a Photovolt photometer Model 577 equipped with a green light filter. The detergency was calculated from the results of these reflectance measurements as described in Example 2. The detergency results are presented in table 9.

TABLE 9

Detergency on cotton soiled with Azo-Barley-Glucan ® after washing in Launderometer with Tide Powder ® at 38° C.

| | Activity/ml | Detergency |
|---|---|---|
| without enzyme | — | 0.61 |
| lichenase from *B. amyloliquefaciens* | 2.25 BGLU | 0.69 |

As will be apparent from the above, lichenase provides for improved washing results.

3.8.1 Tests for Mannanases

A test with mannanases was carried out with stains of guar gum coloured with Congo Red. The stains were made on glass and washing was performed at 40° C. with Calgonit Fl üssig® as described above. The results of washing experiments were evaluated by a panel (the more –the more it was soiled, the more +the more it was clean). See Table 10.

TABLE 10

Performance of mannanases on glass soiled with guar gum

| Experiment | score | Activity/ml |
|---|---|---|
| prior to washing | – – – | – – – |
| without enzyme | – – – | – – – |
| with Galactomannanase Sumizyme ® ACH | + + | 3.9 U |
| mannanase Megazyme ® | + + | 0.8 U |

3.8.2

The experiment was reproduced with glass stained with salad dressing (Thousand Islands®). The results of this experiment are shown in table 11.

TABLE 11

Performance of mannanases on glass soiled with salad dressing after washing with Calgonit Flussig ® at 40° C.

| | Activity/ml | score |
|---|---|---|
| without enzyme | – – – | – – – |
| Galactomannanase Sumizyme ® ACH | 3.9 U | + + |

3.8.3

Mannanases were also tested in laundry washing experiments. Stains of mannan containing salad dressing (Thousand Islands®) were made on polyester fabric (EMPA art.407). The fabrics were washed as described above at 40° C. The detergency-results of the washing tests are presented in Table 12.

TABLE 12

Detergency on polyester after washing in Liquid Tide ® (20 min. 40° C.)

| Experiment | enzyme activity/ml | Detergency |
|---|---|---|
| without enzyme | — | 0.53 |
| galactomannanase Sumizyme ® ACH | 3.9 U | 0.65 |
| alkaline mannanase | 0.001 AMU | 0.84 |

3.8.4

Galactomannanase was tested in a pre-spot test. For this experiment we used cotton (EMPA art.NR. 221; 5×5 cm fabrics) soiled with salad dressing (Thousand Islands®). The stained cotton was spotted with 97 U of Sumizyme® ACH (1 ml of enzyme solution in 50 mM citrate buffer of pH=7), and incubated for 30 minutes at about 20° C. After incubation the cotton fabrics were washed in a Launderometer at 38° C. with Tide Powder® as described in example 3.6.3.

The detergency results are presented in table 13.

TABLE 13

Detergency on cotton soiled with salad dressing after prespotting with galactomannanase and washing in a Launderometer with Tide Powder ® at 38° C.

| | Activity | Detergency |
|---|---|---|
| without enzyme | — | 0.75 |
| with galactomannanase Sumizyme ® ACH | 97 U | 0.83 |

As will be apparent from the above results for mannanases in automatic dish washing, laundry washing and pre-spot experiments, the mannanases provide for improved washing results.

EXAMPLE 4

Stains of mixtures of Azo-Wheat-Arabinoxylan® and Azo-Barley-Glucan® (both obtained from Megazyme), were made on cotton fabrics as described in example 3. The fabrics were washed (using the test-system of example 3.2) for 20 minutes at 40° C. using Liquid Tide® as the detergent. (Dosage: 1 g detergent/l and GH=5). The detergency was calculated from the results of the reflectance measurements as described in Example 2. The detergency results are presented in table 14.

TABLE 14

Detergency on cotton soiled with a mixture of Azo-Wheat-Arabinoxylan ® and Azo-Barley-Glucan ®, and washed with single or a mixture of enzymes.

| | Activity/ml | Detergency |
|---|---|---|
| without enzymes | — | 0.47 |
| xylanase from KEX301 | 3.2 XU | 0.59 |
| Lichenase from *B. amyloliquefaciens* | 4.5 BGLU | 0.65 |

TABLE 14-continued

| Detergency on cotton soiled with a mixture of Azo-Wheat-Arabinoxylan ® and Azo-Barley-Glucan ®, and washed with single or a mixture of enzymes. | Activity/ml | Detergency |
|---|---|---|
| xylanase from KEX301 + lichenase from *B. amyloliquefaciens* | 3.2 XU + 4.5 BGLU | 0.79 |

EXAMPLE 5

A prespot experiment was conducted using CFT-cotton swatches of 25 $cm^2$ NR. CS-8 (these are standard swatches soiled with grass stains and are obtainable from CFT). 112 BGLU lichenase from *B. amyloliquefaciens* (1 ml of an enzyme solution in 50 mM citrate buffer of pH=7.0), was spotted on the stained cotton and incubated for 30 minutes at about 20° C. After this incubation the fabrics were washed in a Launderometer for 20 minutes at 38° C. using Tide Powder® as the detergent. During the washing procedure stainless steel balls (15) and 2 clean EMPA art.NR. 221 swatches of 10×10 cm, were present to resemble real laundry washing application conditions. After washing, the fabrics were air-dried and the reflectance of the test cloth was measured with a Photovolt photometer Model 577 equipped with a green light filter. The detergency was calculated from the results of these reflectance measurements as described in Example 2. The detergency results are presented in table 15.

TABLE 15

| Detergency on CFT CS-8 swatches after prespotting with enzymes and washing with Tide Powder ® in a Launderometer. | Activity | Detergency |
|---|---|---|
| without enzymes | — | 0.11 |
| Lichenase from *B. amyloliquefaciens* | 112 BGLU | 0.20 |

EXAMPLE 6 pH Optimum of the Mannanase from Strain C11SB.G17 (CBS 480.95)

Mannanase was obtained from strain C11SB.G17 (CBS 480.95) according to example 3.4. The following mannanase activity measurement was used to determine the pH optimume of the enzyme.

The initial decrease in viscosity of a (0.5%) guar gum solution was used as a measure for the (endo)mannanase activity at different pH's.

The viscosity decrease of an (60° C.) incubate was (dis)continuously measured with a special device, that is described below.

A pressure transducer (an instrument that measures pressure differences) was T-fitted in the sucking line (polyethylene tubing) of a Gilson model 22 sample changer. The second modification of the sample changer was the fitting of a capillairy in that sucking line.

By sucking of a (viscous) solution through the capillairy the transducer measures a pressure drop, which is correlated with the viscosity of the solution. The viscosity decrease caused by the mannanase activity can be measured (dis) continuously by sucking aliquods from the incubate through the capillairy.

The results of these measurements are expressed in relative activity and are shown in table 16.

TABLE 16 pH optimum of mannanase from strain C11SB.G17 (CBS 480.95).

| pH | relative activity |
|---|---|
| 7.0 | 43 |
| 8.0 | 62 |
| 9.0 | 100 |
| 10.0 | 60 |
| 11.0 | 19 |

What is claimed is:

1. A laundry detergent composition comprising at least one plant cell wall degrading substance, wherein said at least one plant cell wall degrading substance comprises at least two plant cell wall degrading enzymes selected from the group consisting of pectinases and hemicellulases, wherein said hemicellulase is a microbial mannanase obtained from strain C11SB.G17 (CBS 480.95).

2. The laundry detergent composition of claim 1, wherein said at least one plant cell wall degrading substance further comprises cellulase.

3. The laundry detergent composition of claim 2, wherein said cellulase is selected from the group consisting of endoglucanases, exoglucanases, and beta-glucosidases.

4. The laundry detergent composition of claim 1, wherein said pectinase is selected from the group consisting of pectin esterases, pectin lyases, pectate lyases, exopolygalacturonases, endopolygalacturonases, and rhamnogalacturonases.

5. The laundry detergent composition of claim 1, further comprising a second hemicellulase, wherein said second hemicellulase is selected from the group consisting xylanases, arabinofuranosidases, acetyl xylan esterases, glucuronidases, ferulic acid esterases, coumaric acid esterases, endo-galactanases, mannanases, lichenases, endo-arabinases, exo-arabinanases, and exo-galactanases.

6. The laundry detergent composition of claim 5, wherein said second hemicellulase is xylanase.

7. The laundry detergent composition of claim 6, wherein said xylanase is an alkaline xylanase.

8. The laundry detergent of claim 6, wherein said xylanase is obtained from a microorganism selected from the group consisting of Aspergillus, Disporotrichum and Bacillus.

9. The laundry detergent composition of claim 5, wherein said second hemicellulase is a mannanase.

10. The laundry detergent composition of claim 9, wherein said mannanase is an alkaline mannanase.

11. The laundry detergent composition of claim 9, wherein said mannanase is a microbial mannanase.

12. The laundry detergent composition of claim 5, wherein said second hemicellulase is a lichenase.

13. The laundry detergent of composition of claim 12, wherein said lichenase is a microbial lichenase.

14. The laundry detergent composition of claim 13, wherein said microbial lichenase is a Bacillus lichenase.

15. A method of laundering a soiled fabric comprising the steps of contacting said soiled fabric with a composition comprising a laundry detergent composition comprising at least one plant cell wall degrading substance, wherein said at least one plant cell wall degrading substance comprises at least two plant cell wall degrading enzymes selected from the group consisting of pectinases and hemicellulases, wherein said hemicellulase is a microbial mannanase obtained from strain C11SB.G17 (CBS 480.95).

16. The method of claim 15, wherein said soiled fabric is a soiled garment.

17. The method of claim 15, wherein said involves removing unwanted residues of vegetable origin.

18. The method of claim 15, wherein said laundry detergent composition comprises at least one pectinase selected from the group consisting of pectin esterases, pectin lyases, exopolygalacturonases, endopolygalacturonases, and rhamnogalacturonases, and a hemicellulase, wherein said hemicellulase is a microbial mannanse is obtained from strain C11SB.G17 (CBS 480.95), and a second hemicellulase selected from the group consisting of consisting xylanases, arabinofuranosidases, acetyl xylan esterases, glucuronidases, ferulic acid esterases, coumaric acid esterases, endo-galactanases, mannanases, lichenases, endo-arabinases, exo-arabinanases, and exo-galactanases.

19. The method of claim 18, wherein said second hemicellulase is xylanase.

20. The method of claim 19, wherein said xylanase is an alkaline xylanase.

21. The method of claim 19, wherein said xylanase is obtained from a microorganism selected from the group consisting of Aspergillus, Disporotrichum and Bacillus.

22. The method of claim 18, wherein said second hemicellulase is a mannanase.

23. The method of claim 22, wherein said mannanase is a alkaline mannanase.

24. The method of claim 22, wherein said mannanse is a microbial mannanase.

25. The method of claim 18, wherein said second hemicellulase is a lichenase.

26. The method of claim 25, wherein said microbial lichenase is a Bacillus lichenase.

27. The method of claim 26, wherein said microbial lichenase is a Bacillus lichenase.

28. The method of claim 15, wherein said laundry detergent composition further comprises cellulase.

29. The method of claim 28, wherein said cellulase is selected from the group consisting of endoglucanases, exoglucanases, and beta-glucosidases.

* * * * *